(12) United States Patent
Pieske et al.

(10) Patent No.: US 9,169,604 B2
(45) Date of Patent: Oct. 27, 2015

(54) SELF-PROPELLED COMPACTION ROLLER AND METHOD FOR OPERATING A SELF-PROPELLED COMPACTION ROLLER

(75) Inventors: Ronny Pieske, Zwoenitz (DE); Andreas Roehr, Weiden (DE); Thomas Henker, Tirschenreuth (DE); Dieter Stoecklein, Tirschenreuth (DE); Axel Roemer, Tirschenreuth (DE)

(73) Assignee: HAMM AG, Tirschenreuth (DE)

( * ) Notice: Subject to any disclaimer, the term of this patent is extended or adjusted under 35 U.S.C. 154(b) by 0 days.

(21) Appl. No.: 13/993,631

(22) PCT Filed: Dec. 15, 2011

(86) PCT No.: PCT/EP2011/072938
§ 371 (c)(1),
(2), (4) Date: Jun. 12, 2013

(87) PCT Pub. No.: WO2012/080411
PCT Pub. Date: Jun. 21, 2012

(65) Prior Publication Data
US 2013/0266373 A1    Oct. 10, 2013

(30) Foreign Application Priority Data
Dec. 16, 2010  (DE) .................. 10 2010 063 255

(51) Int. Cl.
*E01C 19/26* (2006.01)
*B60K 6/12* (2006.01)

(52) U.S. Cl.
CPC . *E01C 19/26* (2013.01); *B60K 6/12* (2013.01); *B60W 2300/17* (2013.01); *B60Y 2200/413* (2013.01); *Y02T 10/6208* (2013.01)

(58) Field of Classification Search
USPC ...................... 404/122, 128; 180/165; 701/51
IPC ........................ E01C 19/26,19/282; B60K 6/12
See application file for complete search history.

(56) References Cited

U.S. PATENT DOCUMENTS 7,654,354 B1 * 2/2010 Otterstrom .................... 180/165
7,689,341 B2 * 3/2010 Miller ............................. 701/70
(Continued)

FOREIGN PATENT DOCUMENTS

| CN | 101516662 A | 8/2009 |
|---|---|---|
| DE | 4212542 | 10/1993 |

(Continued)

OTHER PUBLICATIONS

German Patent Application No. 10 2010 063 255.4, German Search Report mailed Nov. 24, 2011 (2 pages).
(Continued)

*Primary Examiner* — Gary Hartmann
(74) *Attorney, Agent, or Firm* — Rothwell, Figg, Ernst & Manbeck, P.C.

(57) ABSTRACT

A self-propelled compaction roller comprises a drive system having a drive assembly, a hydrostatic/mechanical transmission arrangement with a hydraulic pump, which can be driven by a primary drive of the drive assembly, and with a hydraulic motor, further having a supporting drive arrangement having a charging/driving unit and an energy storage unit, wherein the charging/driving unit can be operated in a charging mode for storing energy in the energy storage unit and can be operated in a supporting mode by withdrawing energy from the energy storage unit in order to provide a supporting torque, wherein the charging/driving unit is coupled to a power take-off of the drive assembly.

10 Claims, 2 Drawing Sheets

(56) References Cited

U.S. PATENT DOCUMENTS

| | | | |
|---|---|---|---|
| 7,690,450 B2* | 4/2010 | Knestrick et al. | 180/53.4 |
| 8,277,352 B2 | 10/2012 | Ivantysynova et al. | |
| 8,585,317 B1* | 11/2013 | Sina | 404/117 |
| 8,818,653 B2* | 8/2014 | Zhang et al. | 701/51 |
| 2007/0284170 A1* | 12/2007 | Kuras et al. | 180/165 |
| 2009/0241534 A1 | 10/2009 | Tikkanen et al. | |
| 2010/0133032 A1* | 6/2010 | Jeong et al. | 180/165 |

FOREIGN PATENT DOCUMENTS

| | | |
|---|---|---|
| DE | 102006060014 A1 | 6/2007 |
| DE | 102006046127 A1 | 4/2008 |
| DE | 102008015729 A1 | 7/2009 |
| DE | 102010036817 A1 | 3/2011 |
| WO | 2008033378 A1 | 3/2008 |
| WO | 2009083220 A1 | 7/2009 |

OTHER PUBLICATIONS

International Patent Application No. PCT/EP2011/072938, International Search Report mailed Jul. 12, 2012 (2 pages).

Chinese Office Action issued for Chinese Patent Application No. 201180060770X dated Sep. 30, 2014, with English translation, 8 pages.

* cited by examiner

SELF-PROPELLED COMPACTION ROLLER AND METHOD FOR OPERATING A SELF-PROPELLED COMPACTION ROLLER

RELATED APPLICATIONS

The present application is a national phase of PCT/EP2011/072938, filed Dec. 15, 2011, which claims the benefit of priority to German Patent Application No. 10 2010 063 255.4, filed Dec. 16, 2010, each of which is incorporated herein by reference in its entirety.

BACKGROUND OF THE INVENTION

1. Field of the Invention

The present invention relates to a self-propelled compaction roller of the kind used in road construction, for example, in order to compact the earth underneath a roadway and also to compact the construction material of a roadway. Compaction rollers of this kind generally comprise a drive system having a drive assembly designed as a diesel engine, for example. This drive assembly drives a hydrostatic/mechanical driving unit, the latter comprising a hydraulic pump and a hydraulic motor, for example. The energy fed into the hydraulic motor in this driving unit in the form of a flow of pressurized fluid is converted in said hydraulic motor into kinetic energy for the travel drive and, if appropriate, also for an oscillator or vibrator.

2. Background of the Related Art

DE 10 2006 060 014 B4 discloses a hydrostatic drive in which recovery of braking energy is provided in order to obtain efficient use of energy. For this purpose, an energy storage unit is integrated into the hydrostatic/mechanical transmission arrangement, i.e. into the circuit for the flow of pressurized fluid between the hydraulic pump and the hydraulic motor. In the overrun state, that is to say when a drive assembly driving the hydraulic pump is not being operated for the purpose of outputting a driving torque but is being used to support a braking torque, the hydraulic motor operates as a pump and charges a pressurized fluid accumulator of the energy storage unit. In the traction state, that is to say when a driving torque is being provided by a drive assembly in order to drive the hydraulic pump, the energy thus stored in the overrun state is fed into the pressurized fluid circuit between the hydraulic pump and the hydraulic motor in order to provide support.

DE 10 2006 046 127 A1 discloses a drive system having a hydrostatic/mechanical transmission arrangement, in which the drive shaft of a diesel internal combustion engine acting as a drive assembly drives both a hydraulic pump and, via a gear stage, the hydrostatic/mechanical transmission arrangement. Together with the hydraulic pump of the hydrostatic/mechanical transmission arrangement, a hydraulic pump/motor unit is driven, which can be varied between a pump mode and a motor mode and, in the pump mode, charges a pressurized fluid accumulator and, in the motor mode, drives the hydraulic pump of the hydraulic/mechanical transmission arrangement via a mechanical interface in parallel with the driving torque supplied by the diesel internal combustion engine.

DE 10 2008 015 729 A1 discloses a drive system in which the driving torque provided by a diesel engine is transmitted to driven wheels via a mechanical transmission. A hydraulic pump/motor unit for charging a pressurized fluid accumulator in the pumping mode is operated via a power takeoff shaft of the transmission. In the motor mode, a supporting torque can be introduced into the power takeoff shaft of the transmission by withdrawing energy stored in the pressurized fluid accumulator by means of the hydraulic pump/motor unit.

SUMMARY OF THE INVENTION

It is the object of the present invention to provide a self-propelled compaction roller and a method for operating a self-propelled compaction roller by means of which more efficient use of energy can be achieved while simplifying the design configuration of the drive system of a self-propelled compaction roller.

According to a first aspect of the present invention, this object is achieved by a self-propelled compaction roller comprising a drive system having a drive assembly, a hydrostatic/mechanical transmission arrangement with a hydraulic pump, which can be driven by a primary drive of the drive assembly, and with a hydraulic motor, and having a supporting drive arrangement with a charging/driving unit and an energy storage unit, wherein the charging/driving unit can be operated in a charging mode in order to store energy in the energy storage unit and can be operated in a supporting mode by withdrawing energy from the energy storage unit in order to provide a supporting torque, wherein the charging/driving unit is coupled to a power takeoff of the drive assembly.

In the drive system of a self-propelled compaction roller configured in accordance with the invention, the interaction between the supporting drive arrangement and the remaining part of the drive system takes place via the power takeoff, that is to say, for example, a power takeoff shaft, of the drive assembly, which is designed as a diesel internal combustion engine, for example. This means that there is no need to implement any further design measures for the torque coupling of the supporting drive arrangement in the region of the primary drive, i.e. at the crankshaft acting as the primary drive shaft for example. Moreover, no design modifications are required in that part of the drivetrain which follows the primary drive of the drive assembly. At the same time, however, the provision of the supporting drive arrangement and the possibility of using the supporting torque thereof in peak load states, that is to say, for example, when starting the compaction roller, makes possible reduced dimensioning of the drive assembly per se. This can be designed in such a way that it is of adequate dimensions for the loads which occur in normal operation but is not solely responsible for also providing the torques or power outputs which occur in the peak load state. Here, the supporting drive arrangement acts in a supporting role in such a way that the required power or the required torque can be output at the primary drive of the drive assembly without there being any perceptible effect in that part of the drive system which then follows as to whether the driving torque is being provided only by the drive assembly itself, even in peak load states, or is being provided with the support of the supporting drive arrangement.

Since there are generally structural measures for fluid conduction and fluid storage in self-propelled compaction rollers, necessitated especially by the fact that a hydrostatic/mechanical transmission arrangement is coupled to the primary drive of the drive assembly, it is particularly advantageous if the charging/driving unit comprises a hydraulic pump/motor unit, wherein the hydraulic pump/motor unit can be operated as a pump by the power takeoff of the drive assembly in the charging mode in order to increase a fluid accumulator pressure in the energy storage unit, and can be operated as a motor for the application of a supporting torque to the power takeoff of the drive assembly in the supporting mode by making use of the fluid accumulator pressure in the energy storage unit.

In another particularly advantageous variant, it is proposed that the hydraulic pump/motor unit be designed with a variable delivery/displacement volume. This not only makes it possible to achieve adaptation to the pressure conditions in the energy storage unit by varying the delivery volume in the pump mode but also makes it possible to set the supporting torque introduced into the drive assembly via the power takeoff in accordance with the existing requirements by varying the displacement volume in the motor mode.

In order to minimize pressure losses from the energy storage arrangement, it is furthermore proposed that a valve arrangement for the selective opening and blocking of a fluid flow connection between the hydraulic pump/motor unit and the energy storage unit be provided in the fluid flow path between the hydraulic pump/motor unit and the energy storage unit. Here, the energy storage unit is preferably formed by at least one pressurized fluid accumulator.

According to another aspect, the object stated at the outset is achieved by a method for operating a self-propelled compaction roller, in particular of the construction described above, wherein the compaction roller comprises a drive system having a drive assembly, a hydrostatic/mechanical transmission arrangement with a hydraulic pump, which can be driven by the drive assembly, and with a hydraulic motor, and having a supporting drive arrangement with a charging/driving unit and an energy storage unit, wherein the charging/driving unit can be operated in a charging mode in order to store energy in the energy storage unit and can be operated in a supporting mode by withdrawing energy from the energy storage unit in order to provide a supporting torque, in which method the charging/driving unit is operated in the charging mode thereof when the drive system is operated in a first traction operating state.

In this procedure according to the invention, energy recovery with the possibility of subsequent use is not provided or not provided exclusively by the kinetic energy released during braking or in the overrun state, for example. Rather, the present invention makes use of the fact that, in normal operation, i.e. in a traction state of the drive system, in which a driving torque is delivered by the drive assembly, the drive assembly is not subjected to a maximum load or operates in an operating state with a high efficiency, even in the case of additional loading for energy storage. This advantage comes into play particularly when the supporting drive arrangement is operated via a power takeoff of the drive assembly or provides its supporting torque there since, in the normal traction mode, i.e. torque output by the drive assembly into that part of the drive system which follows in the torque transmission path, no adaptation measures are then necessitated by the fact that not only energy, e.g. for the travel drive, but also energy for storage in the energy storage unit has to be provided in this traction operating state.

Provision can be made here, for example, for the first traction operating state to be a traction operating state with a substantially constant or decreasing speed of travel of the self-propelled compaction roller. One particular characteristic of self-propelled compaction rollers is that they are operated at least partially in a traction mode, although with a decreasing driving torque, when the intention is to reduce their speed. The phase in which energy can be stored in the energy storage unit by means of the operating method according to the invention can therefore also be extended into this operating state involving a decreasing speed of travel, in which the drive assembly is not used for braking torque support, and consequently the recovery of braking energy would not even be possible.

To enable the energy stored in the energy storage unit to be exploited, it is proposed that the charging/driving unit be operated in the supporting mode thereof when the drive system is operated in a second traction operating state, wherein the second traction operating state comprises a traction operating state with an increasing speed of travel and/or a hill climbing travel mode. Here, the second traction operating state can be a starting mode, for example. As already explained at the outset, this enables the drive system to be configured with a drive assembly of relatively small dimensions which is designed for the loads that occur in the normal travel or working mode but which could not on its own absorb the peak loads that occur especially during starting or indeed hill climbing, at least if a vibrator or oscillator is to be put into operation at the same time as well.

BRIEF DESCRIPTION OF THE DRAWINGS

The present invention is explained in detail below with reference to the attached FIG. 1, which shows a drive system for a self-propelled compaction roller in a diagrammatic representation, and FIG. 2, which shows a self-propelled compaction roller.

Of course, provision can be made in the procedure according to the invention too for the charging/driving unit to be operated in the charging mode thereof when the drive system is operated in an overrun operating state. This means that when an engine braking state, that is to say an overrun state, actually occurs, the kinetic energy which is released in the process can be used for the purpose of storing at least a part thereof in the energy storage unit.

The present invention is explained in detail below with reference to the attached FIG. 1, which shows a drive system for a self-propelled compaction roller in a diagrammatic representation.

DETAILED DESCRIPTION

Figure 1:
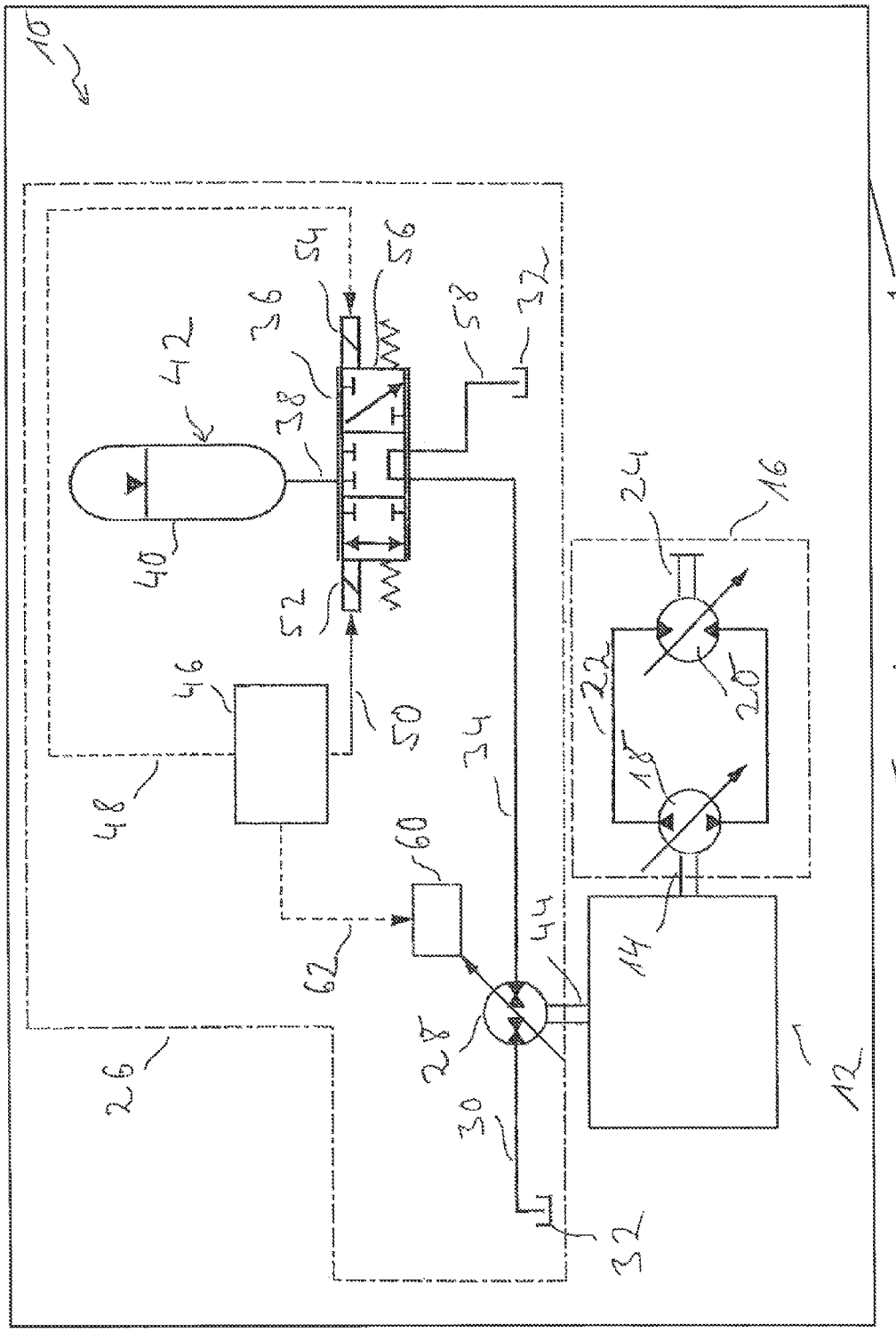
Figure 2:
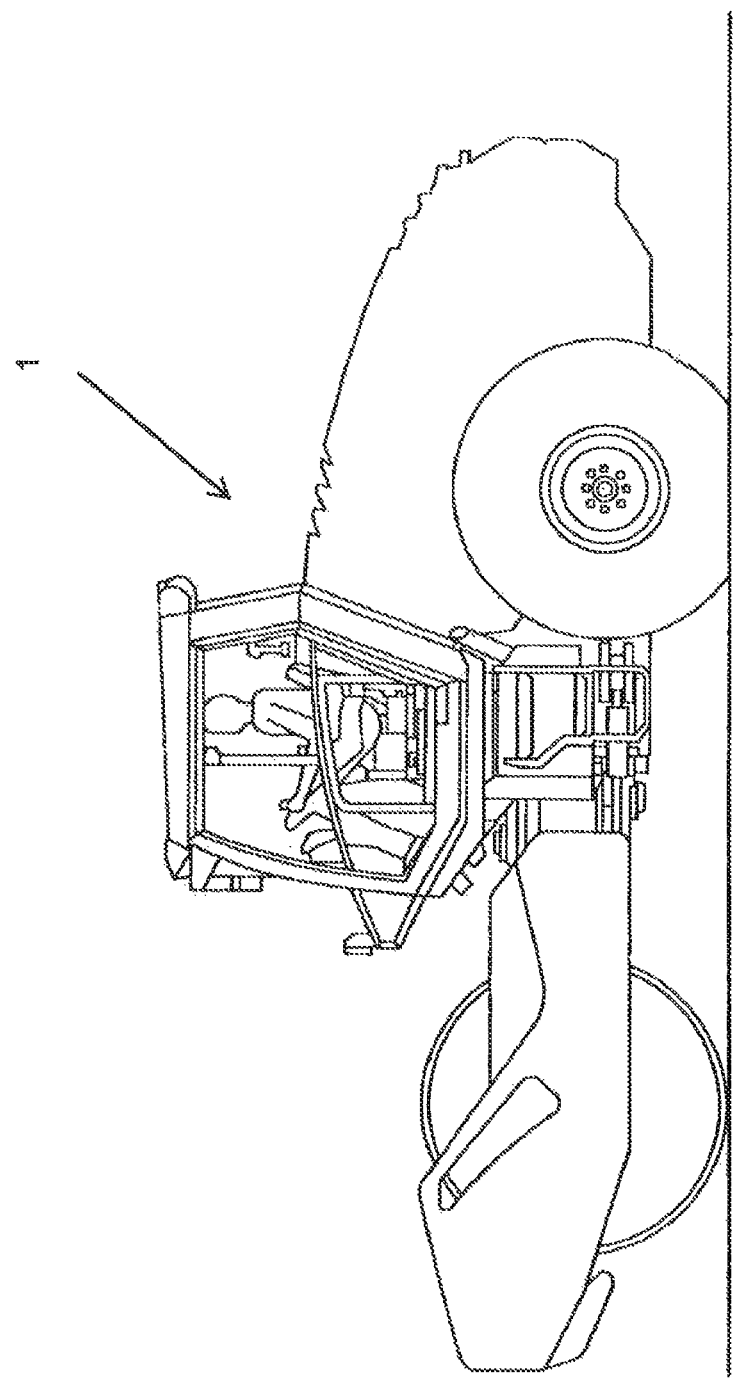

In FIG. 1, a drive system for a compaction roller 1 (for example as shown in FIG. 2), which can be used in road construction for compacting a subgrade or the construction material of a roadway pavement for example, is denoted overall by 10. The drive system 10 comprises a drive assembly 12 designed as a diesel internal combustion engine for example, which introduces a driving torque into a hydrostatic/mechanical transmission arrangement 16 via a primary drive or a primary drive shaft 14. The hydrostatic/mechanical transmission arrangement 16 comprises a hydraulic pump 18 which is driven or can be driven by the primary drive shaft 14, a hydraulic motor 20 and a fluid circuit 22 between the hydraulic pump 18 and the hydraulic motor 20. It should be noted that it would also be possible to select an open system here, in which the hydraulic pump 18 takes the fluid to be delivered from a fluid reservoir, and the hydraulic motor 20 feeds the fluid flowing through it, that is to say, for example, oil, back into the reservoir. On the output side, the hydraulic motor 20 is coupled to systems to be driven, that is to say, for example, the travel drive and/or the drive for an oscillator or a vibrator, as indicated by way of example by an output shaft 24.

It should be noted that the hydraulic pump 18 and/or the hydraulic motor 20 can be constructed with a variable delivery volume or displacement volume. In the normal working mode, the drive assembly 12 can thus be operated in a state in which the energy is exploited as efficiently as possible. A variation in the speed of travel can then be achieved, for example, by changing the delivery volume of the hydraulic pump 18 or changing the displacement volume of the hydraulic motor 20.

The drive system 10 furthermore comprises a supporting drive arrangement 26. This supporting drive arrangement 26 comprises a charging/driving unit 28, here designed as a hydraulic pump/motor unit. This unit can be operated as a pump in a charging mode and, in this case, withdraws fluid, that is to say, for example, oil, via a fluid line 30 from a reservoir 32 and delivers it via a fluid line 34, a valve arrangement 36 and a further fluid line 38 to an energy storage unit 42 comprising at least one pressurized fluid accumulator 40.

The charging/driving unit 28 is coupled to a power takeoff or a power takeoff shaft 44 of the drive assembly 12. In the pumping mode, the charging/driving unit 28 is operated by the power takeoff shaft 44 in order in this way to increase the fluid pressure in the energy storage unit 42. In the supporting mode, in which the charging/driving unit does not act as a pump but as a motor, the charging/driving unit 28 drives the power takeoff shaft 44 and applies a supporting torque to the power takeoff shaft 44.

In order to switch between the charging or pumping mode, on the one hand, and the supporting drive or motor mode, the valve arrangement 36 is subject to control by a control unit 46. This unit can put into operation or excite electromagnet units 52, 54 of the valve arrangement 36 via respective control lines 48, 50, thus enabling the valve arrangement 36 to be brought into its various valve positions, indicated symbolically in FIG. 1. In the valve position occupied in FIG. 1, the fluid line 38 leading to the energy storage unit 42 is closed by a valve slide 56. Fluid line 34 is connected to the reservoir 32 by another fluid line 58. By moving the valve body 56 to the right, a connection is established between the two fluid lines 34 and 38, and hence a connection is established between the charging/driving unit 28 and the energy storage unit 42, while the connection to the reservoir 32 is interrupted. In this state of actuation of the valve arrangement 36, it is possible either for the fluid pressure in the energy storage unit 42 to be increased in the charging mode or for the charging/driving unit 28 to apply a supporting torque to the power takeoff shaft 44 in the supporting mode by using the energy stored in the energy storage unit 42, this therefore being accompanied by a pressure decrease in the at least one pressurized fluid accumulator 40. The fluid flowing out of the at least one pressurized fluid accumulator 40 during this process passes via fluid line 30 to the reservoir 32.

By moving the valve slide 56 to the left in FIG. 1, the fluid line 34 is closed. At the same time, a connection of fluid line 38 to fluid line 58 and hence between the energy storage unit 42 and the reservoir 32 is created. Thus, the pressure in the at least one pressurized fluid accumulator 40 can be released. This valve position can be occupied, for example, when the compaction roller is taken out of operation and it is foreseeable that the provision of a supporting torque by the supporting drive arrangement 26 will not be required within the foreseeable future. It is thus possible to avoid prolonged, relatively severe mechanical loading of the energy storage unit 42 by the fluid pressure prevailing therein.

It should be noted that, of course, the valve arrangement 36 can be regulated in its various valve positions in order, for example, to achieve a gradual pressure release.

In association with the charging/driving unit 28, a further control unit 60 can be provided, which can be coupled in terms of control engineering to control unit 46 via a control line 62. In conjunction with the various valve positions that can be set in the valve arrangement 36, it is thus possible to modify the operating characteristic of the charging/driving unit 28 in order, for example, fundamentally to switch between a charging, i.e. pump, mode, on the one hand, and a driving, i.e. motor, mode, on the other hand or to set or regulate the delivery volume in the pump mode and/or to set or regulate the displacement volume in the motor mode. It is thus possible in the pump mode to adapt the volume flow of the fluid delivered in the direction of the energy storage unit 42 to the already existing fluid pressure at that point, e.g. in such a way that the fluid volume flow decreases with increasing fluid pressure. In the motor mode, the displacement volume can accordingly be adapted in order to be able to adapt the supporting torque applied to the power takeoff shaft 44 to the state of load of the drive system 10.

The construction according to the invention of the drive system 10 for a self-propelled compaction roller makes it possible to select the dimensions for the drive assembly in such a way that the torque provided thereby is sufficient for the normal state of loading. In peak load states, the supporting drive arrangement 26 supplies a supporting torque introduced into the drive assembly 12 via the power takeoff, with the result that no technical modifications are required to that part of the drive system 10 which follows the primary drive or the primary drive shaft 14, either as regards mode of operation or as regards construction. The selection of a drive assembly 12 of smaller dimensions leads to savings in terms of costs, installation space and weight in comparison with a construction in which the entire torque or the entire driving power is provided by the drive assembly 12.

Another significant advantage of the construction according to the invention is that the storage of energy, i.e. the operation of the charging/driving unit 28, is possible irrespective of whether the drive system 10 or the drive assembly 12 is operating in a traction state or an overrun state. According to the invention, this can be used for the purpose of ensuring that when the drive system 10 is in a normal operating state, i.e. a compaction roller is traveling at a substantially constant speed, for example, energy is also simultaneously stored in the energy storage unit 42. In such an operating state, the drive assembly 12 can be operated in such a way that it operates in a manner which is optimized in terms of torque and/or consumption. The adaptation of the speed of travel can then be accomplished through appropriate setting of the delivery volume of the hydraulic pump 18 and/or the displacement volume of the hydraulic motor 20. Of course, it is also possible to charge the energy storage unit 42 when the speed of travel is reduced, while nevertheless continuing a traction mode, or when the speed of travel is reduced in an overrun operating state, i.e. the drive assembly 12 is used to support the braking torque.

The energy stored in the energy storage unit 42 can be drawn off when a peak load occurs. This is the case, for example, when a compaction roller starts from the stationary condition or the speed of travel thereof is to be increased, this generally being accompanied by a vibrator or oscillator present in the region of at least one drum being put into operation, for which purpose additional energy is required. In these peak load phases, the supporting drive unit 26 supports the drive assembly 12 by applying a supporting torque to the power takeoff. Here, therefore, the hybrid drive-type construction of the drive system according to the invention comes into play, and it can be used with significantly higher efficiency by virtue of the fact that the storage of energy can take place within a significantly wider range of operating states with the construction according to the invention and the method of operation according to the invention.

The invention claimed is:

1. A self-propelled compaction roller comprising a drive system having
   a drive assembly,
   a hydrostatic/mechanical transmission arrangement with a hydraulic pump, which is drivable by a primary drive assembly, and with a hydraulic motor, the primary drive comprising a primary drive shaft,
   a supporting drive arrangement with a charging/driving unit and an energy storage unit, wherein the charging/driving unit is operable in a charging mode in order to store energy in the energy storage unit and is operable in a supporting mode by withdrawing energy from the energy storage unit in order to provide a supporting torque,
   wherein the charging/driving unit is coupled to a power takeoff of the drive assembly, the power takeoff comprising a power takeoff shaft.

2. The self-propelled compaction roller according to claim 1, wherein the charging/driving unit comprises a hydraulic pump/motor unit, wherein the hydraulic pump/motor unit is operable as a pump by the power takeoff of the drive assembly in the charging mode in order to increase a fluid accumulator pressure in the energy storage unit, and is operable as a motor for the application of a supporting torque to the power takeoff of the drive assembly in the supporting mode by making use of the fluid accumulator pressure in the energy storage unit.

3. The self-propelled compaction roller according to claim 2, wherein the hydraulic pump/motor unit is designed with a variable delivery/displacement volume.

4. The self-propelled compaction roller according to claim 2, wherein a valve arrangement for the selective opening and blocking of a fluid flow connection between the hydraulic pump/motor unit and the energy storage unit is provided in the fluid flow path between the hydraulic pump/motor unit and the energy storage unit.

5. The self-propelled compaction roller according to claim 2, wherein the energy storage unit comprises at least one pressurized fluid accumulator.

6. A method for operating a self-propelled compaction roller, said drive system having a drive assembly, a hydrostatic/mechanical transmission arrangement with a hydraulic pump, which is drivable by the drive assembly, and with a hydraulic motor, the drive comprising a drive shaft, and having a supporting drive arrangement with a charging/driving unit and an energy storage unit, wherein the charging/driving unit is operable in a charging mode in order to store energy in the energy storage unit and is operable in a supporting mode by withdrawing energy from the energy storage unit in order to provide a supporting torque, and wherein the charging/driving unit is coupled to a power takeoff of the drive assembly, the power takeoff comprising a power takeoff shaft, in which method the charging/driving unit is operating in the charging mode thereof when the drive system is operating in a first traction operating state.

7. The method according to claim 6, wherein the first traction operating state is a traction operating state with a substantially constant or decreasing speed of travel of the self-propelled compaction roller.

8. The method according to claim 6, wherein the charging/driving unit is operating in the supporting mode thereof when the drive system is operating in a second traction operating state, wherein the second traction operating state comprises a traction operating state with an increasing speed of travel and/or a hill climbing travel mode.

9. The method according to claim 8, wherein the second traction operating state is a starting mode.

10. The method according to claim 6, wherein the charging/driving unit is operating in the charging mode thereof when the drive system is in an overrun operating state.

* * * * *